(12) United States Patent
Rimar et al.

(10) Patent No.: US 10,148,549 B2
(45) Date of Patent: Dec. 4, 2018

(54) SYSTEM AND METHOD FOR IDENTIFYING COMPONENTS OF A COMPUTER NETWORK BASED ON COMPONENT CONNECTIONS

(71) Applicant: ServiceNow, Inc., Santa Clara, CA (US)

(72) Inventors: Yuval Rimar, Petah Tikva (IL); Haviv Rosh, Modiin (IL)

(73) Assignee: ServiceNow, Inc., Santa Clara, CA (US)

( * ) Notice: Subject to any disclaimer, the term of this patent is extended or adjusted under 35 U.S.C. 154(b) by 211 days.

(21) Appl. No.: 15/338,552

(22) Filed: Oct. 31, 2016

(65) Prior Publication Data

US 2018/0123940 A1 May 3, 2018

(51) Int. Cl.
*H04L 12/751* (2013.01)
*H04L 12/24* (2006.01)
*H04L 12/26* (2006.01)

(52) U.S. Cl.
CPC .......... *H04L 45/02* (2013.01); *H04L 41/0853* (2013.01); *H04L 41/12* (2013.01); *H04L 43/10* (2013.01); *H04L 41/0856* (2013.01)

(58) Field of Classification Search
CPC ..... H04L 45/02; H04L 41/0853; H04L 41/12; H04L 43/10; H04L 41/0856
See application file for complete search history.

(56) References Cited

U.S. PATENT DOCUMENTS

| | | | |
|---|---|---|---|
| 6,377,987 B1 * | 4/2002 | Kracht | H04L 41/0213 370/254 |
| 7,380,025 B1 | 5/2008 | Riggins et al. | |
| 7,580,356 B1 | 8/2009 | Mishra et al. | |

(Continued)

FOREIGN PATENT DOCUMENTS

JP  2012253735 A  12/2012

OTHER PUBLICATIONS

Kind, Andreas et al.; "Relationship Discovery With Netflow to Enable Business-Driven IT Management", The First IEEE/IFIP International Workshop on Business-Driven IT Management, May 2006, 7 pp.

(Continued)

*Primary Examiner* — Jerry B Dennison
(74) *Attorney, Agent, or Firm* — Fletcher Yoder, P.C.

(57) ABSTRACT

Identifying components of a computer network based on connections between the components includes performing a first discovery operation to identify respective attributes of a first set of components and performing a second discovery operation to infer respective components of the second set of components not identifiable by the first discovery operation. The second discovery operation is performed by sending probes for collecting network flow data indicative of network flows between components of the first set of components and other components of the computer network. The collected network flow data is used to identify connections between ones of the first set of components and ones of the other components, determining sequences of the identified connections, and infer respective attributes of at least some of the second set of components based on the determined sequences of the identified connections.

20 Claims, 9 Drawing Sheets

(56) References Cited

U.S. PATENT DOCUMENTS

| | | | |
|---|---|---|---|
| 8,089,895 B1 | 1/2012 | Mackie | |
| 8,762,298 B1 | 6/2014 | Ranjan et al. | |
| 2011/0302290 A1 | 12/2011 | Westerfeld et al. | |
| 2013/0117847 A1 | 5/2013 | Friedman et al. | |
| 2015/0280999 A1* | 10/2015 | Chart | H04L 41/12 709/224 |
| 2018/0123940 A1* | 5/2018 | Rimar | H04L 45/02 |

OTHER PUBLICATIONS

Solarwinds, "Engineer's Toolset", Version 11.0.3, Administrator Guide, Aug. 19, 2016, https://support.solarwinds.com/@api/deki/files/5697/ToolsetAdministratorGuide.pdf, pp. 89-94, 102, 193 and 228-229.

Cisco.com, "Introduction to Network Discovery and Identity", Firepower Management Center Configuration Guide, Version 6.0, Uses for Host, Application, and User Discovery and Identity Data, Date Unknown, downloaded Oct. 19, 2016, http://www.cisco.com/c/en/us/td/docs/security/firepower/60/configuration/guide/fpmc-config-guide-v60/Introduction_to_Network_Discovery.pdf, 16 pp.

Cisco.com, Introduction to Network Discovery, Understanding Discovery Data Collection, Chapter 45, FireSIGHT System User Guide, Date Unkown, downloaded Oct. 19, 2016, http://www.cisco.com/c/en/us/td/docs/security/firesight/541/user-guide/FireSIGHT-System-UserGuide-v5401/Discovery-Config.pdf, 38 pp.

Berthier, Robin, et al.; "Nfsight: Netflow-Based Network Awareness Tool", Date Unknown, downloaded Oct. 19, 2016, http://web2-clone.research.att.com/export/sites/att_labs/techdocs/TD_100147.pdf, 16 pp.

* cited by examiner

SYSTEM AND METHOD FOR IDENTIFYING COMPONENTS OF A COMPUTER NETWORK BASED ON COMPONENT CONNECTIONS

TECHNICAL FIELD

This disclosure relates in general to identifying components of a computer network based on component connections.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Most individuals and organizations, such as businesses and governmental agencies, utilize computers on a daily basis to perform a variety of functions. These functions may include, for example, email, Internet access, word processing, computer-aided design, media streaming, and many others. Indeed, individuals and organizations not only utilize their own computers to perform these functions, but since many of the functions are "cloud-based" most individuals and organizations utilize servers in data centers around the globe to perform many of these functions.

As organizations grow, the number of users and, thus, computers and associated devices, such as file servers, email servers, routers, etc., increase as well. Hence, many organizations utilize Information Technology Operations Management (ITOM) tools to manage such systems. The ITOM tools may include policies, processes, and procedures to design and maintain the computers and associated functionalities for an organization. For example, ITOM tools may keep track of components within an organization (e.g., user computers and associated software, servers, routers, etc.) so that administrators can determine when users have been added or removed, when equipment has been added, removed, or needs to be upgraded, when software needs to be updated, etc.

When dealing with individuals or small organizations, such tasks can be relatively straight forward and easy to perform. However, as organizations and their associated information technology (IT) infrastructure grow, designing and maintaining such systems can be a difficult task. To facilitate the management of IT systems in such organizations, discovery services are available to provide administrators a process by which devices, software, and associated functionalities may be discovered and mapped. Some of these discovery services may be cloud-based where an ITOM service provider maintains one or more datacenters that can facilitate discovery services within an organization's network or networks to perform such discovery services, while other discovery services may be performed "on-premises" by IT administrators utilizing discovery software residing within the organization's computer network.

Information about the various components, such as IP addresses and ports used to send or receive data within the computer network, can be identified by performing discovery operations on the computer network. Traffic information collected within the computer network can indicate how components of the computer network communicate with one another.

BRIEF DESCRIPTION OF THE DRAWINGS

The description herein makes reference to the accompanying drawings, wherein like reference numerals refer to like parts throughout the several views.

DETAILED DESCRIPTION

Figure 1:
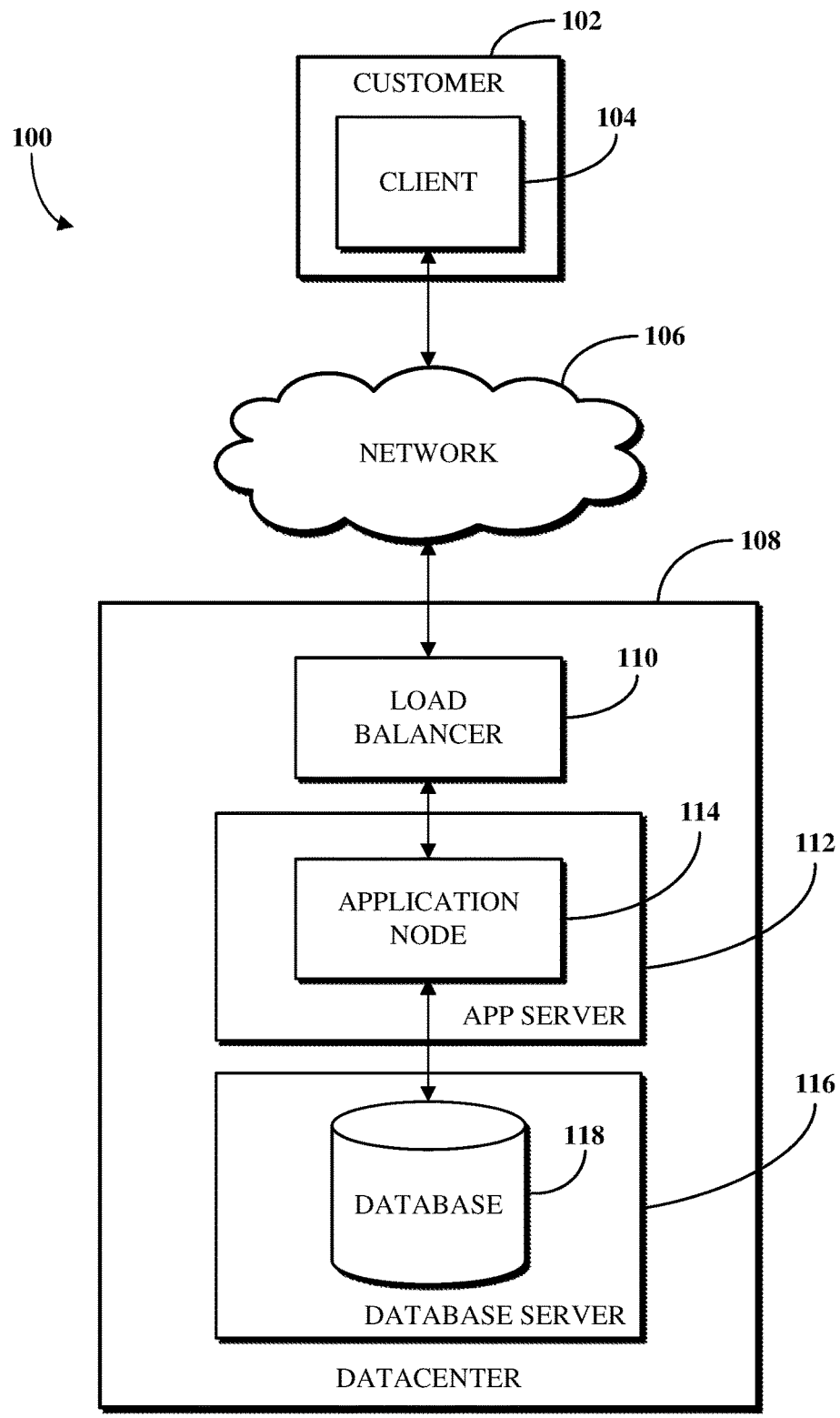
FIG. 1 is a block diagram of an example of an electronic computing and communications system.

Computer network discovery techniques can be used to create or maintain accurate information about the various components associated with the computer network. Such information can be useful to, for example, a network administrator maintaining a computer network by providing the network administrator information about the computer network that would otherwise not be known to the network administrator. For example, the network administrator may be a part of a large organization or may be new to an organization where other network administrators may have previously set up, provisioned, or maintained components of the computer network. For example, the network administrator may be maintaining a network where users of the network may have connected devices or installed software on their own without contacting the IT department of the organization. In situations such as these, it is beneficial for a network administrator to have access to information about the current or near-current state of the computer network.

Generally, a discovery operation can include detecting a component of the computer network; identifying information about the component, such as status or configuration data (also referred to herein as "attributes"); and creating or updating a record for the component. The record can take the form of a configuration item (CI) representing the component in a configuration management database (CMDB). These records can include or be used to define relationships between components of the computer network.

In some cases, the computer network can be part of a customer environment of an electronic computing and communications system (such as a customer 102, described later). The customer environment can include software and hardware controlled by a customer. For example, the customer environment can be bounded by firewalls, routers, or other gateway devices that separate customer controlled networks and devices from external networks and devices, such as connections to the Internet or third parties. Software for managing the network (e.g., Information Technology Service Management (ITSM), ITOM, or the like) can be provided as a Software-as-a-Service (SaaS) or Platform-as-a-Service (PaaS) service in a provider environment (such as a datacenter 108, described later), as on-premises software within the customer environment, or a combination thereof.

The provider environment can include software and hardware controlled by a provider for providing instances of the software for managing the network. In some implementations, software and hardware in the customer environment may not be directly accessible from the provider environment. Agent software operating within the customer environment can operate to permit communication between the provider and customer environments (e.g., by initiating a connection from within the customer environment to a provider environment, such as by using an HTTP protocol permitted by a firewall of the customer environment). The agent software can thus be used for operations directed by the management software within the customer environment, such as for performing discovery operations to identify attributes of those components. In implementations where the software for managing the network is installed within the customer environment, the agent software can in some instances be omitted and the actions performed by the agent can be performed by the platform software, for example.

The identification of information about a component can include using credentials usable for the component to log into or otherwise access the component to obtain information about the component not accessible to anonymous or public users of the component. For example, if the component is a server device running a Linux operating system, the IP address, open ports, and operating system may be detectable without having credentials to the server device (e.g., by pinging the device, by sending requests to open ports on the device (without sending login information) and interpreting the results, and the like). However, other information about the device may require logging into the device. For example, a listing of processes running on the device, a configuration file for a web server, disk space status, CPU usage status, and the like may not be obtainable through a request to the server device without logging into the device, such as by using Secure Shell (SSH) and an administrator user account. The requirement of credentials to complete the discovery operation may cause the discovery operation to fail or store incomplete information about the device in the CMDB, for example. The occurrence of missing credentials may, for example, delay the discovery operation or require a user to enter the credentials.

However, obtaining credentials can be difficult. For example, in large computer networks having hundreds or thousands of components, it can take a long time (weeks, months, or the like) to obtain the credentials needed to send discovery probes to those components. Furthermore, once credentials are obtained, it can take additional time to configure the use of credentials to obtain information about those components (e.g., where the component is not accessible using the credentials) or to identify and correct incorrect credentials (e.g., when the credential does not work for a given component). As such, it can be advantageous to have another technique for discovering at least partial information about components of a computer network when credentials are not available for those components. That way, at least some information about those components can be identified for use, for example, by a network administrator in maintaining the computer network, and more comprehensive information about those components can be identified once credentials become available.

Implementations of this disclosure can be used to obtain data not collected during a discovery operation, such as for the reason that credentials for components of the computer network were not available. For example, a system or technique can be used to identify attributes of components for which credentials are not available using network flow data collected within a computer network. Components of the computer network send data packets to one another to provide software services to clients of the computer network. Information about how these data packets are sent between components can be recorded by monitoring network flows within the computer network. That information, which can include IP addresses of components that send and receive the data packets and the ports via which the data is sent or received, can be used to determine how components connect to one another to provide a software service in the computer network.

For example, a sequence of connections between components of a computer network can be determined by comparing the IP address and port of a component receiving a first data packet (e.g., a "destination component") with the IP address and port of a component sending a second data packet (e.g., a "source component"). A counter can be used to track the number of times that a match is determined between an IP address and port of a destination component and that of a source component. For example, a higher count can indicate that the component is more likely to be a server. In some cases, there may be a high probability that a sequence of connections can be determined based on the matched components once the counter has exceeded a configurable threshold. The counter can be used to prevent a false identification of a component by requiring a level of confidence for the identification. Such a counter or threshold can, for example, prevent a false identification caused by data packets sent and received in connection with automated unit testing performed in the computer network or other network maintenance purposes.

Components involved in providing the software service, but for which credentials are unavailable, can be identified based on the determined sequences such that attributes of those components can be inferred. As such, although a determined sequence of connections might pertain to a number of components, one or more of those components might not be represented by records of the computer network (e.g., CIs of a CMDB), such as where credentials for logging into those components are not available. For example, a sequence of connections can include a first component that is known to be a load balancer and a third component that is known to be a database server. The load balancer is a source component that sends a data packet to some unknown second component, which unknown second component is a source component that sends a data packet to the database server. Based on the identification of the first and third components, it can be inferred that the second component is a server of some type, such as a web server.

As such, a sequence of connections not only establishes that a connection exists between a pair of components of a computer network, but also that there is a cause and effect relationship between those components in regards to the sending and receiving of data packets between them. Determining a sequence of connections can thus result in otherwise unidentifiable attributes of computer network components being inferred. This inference can give a clearer understanding of the components of the computer network to a network administrator.

The collected network flow data can also be used to create or update a map of a service model within a customer environment, which service model relates to CIs of a CMDB and defines a software service usable by clients of the customer environment (e.g., email, electronic messaging, or the like). For example, given an entry point that includes a URL into a software service, the URL can be mapped to an IP address and port of a first component of the customer environment. Based upon that mapping, and using the collected network flow data, a sequence of connections that indicate further components used to provide the service model associated with that entry point (e.g., by connecting to the first component) can be determined.

Implementations of this disclosure provide technological improvements particular to computer networks, for example, those concerning the performance of discovery operations to identify computer network component attributes. Computer network-specific technological problems, such as the unavailability of credentials for components to be identified via discovery operations, can be wholly or partially solved by implementations of this disclosure. For example, agent software executing in a computer network can execute probes to identify network flows within the computer network, which network flows indicate how pairs of components of the computer network send data to and receive data from one another. Data indicative of the network flows can be compared to records of the computer network to identify components with which the network flows are associated. The implementations of this disclosure introduce new and efficient improvements in the ways in which discovery operations can be performed to identify components of a computer network by identifying connections between the components using network flow data, determining sequences of the identified connections, and inferring attributes of components not previously identified via a discovery operation using the determined sequences of identified connections.

Aspects of this disclosure can be implemented into discovery software applications for performing discovery of a computer network, such as ServiceNow Discovery software provided by ServiceNow, Inc. of Santa Clara, Calif. Aspects of this disclosure can be implemented using agent software, such as MID server software provided by ServiceNow, Inc. of Santa Clara, Calif.

Figure 2:
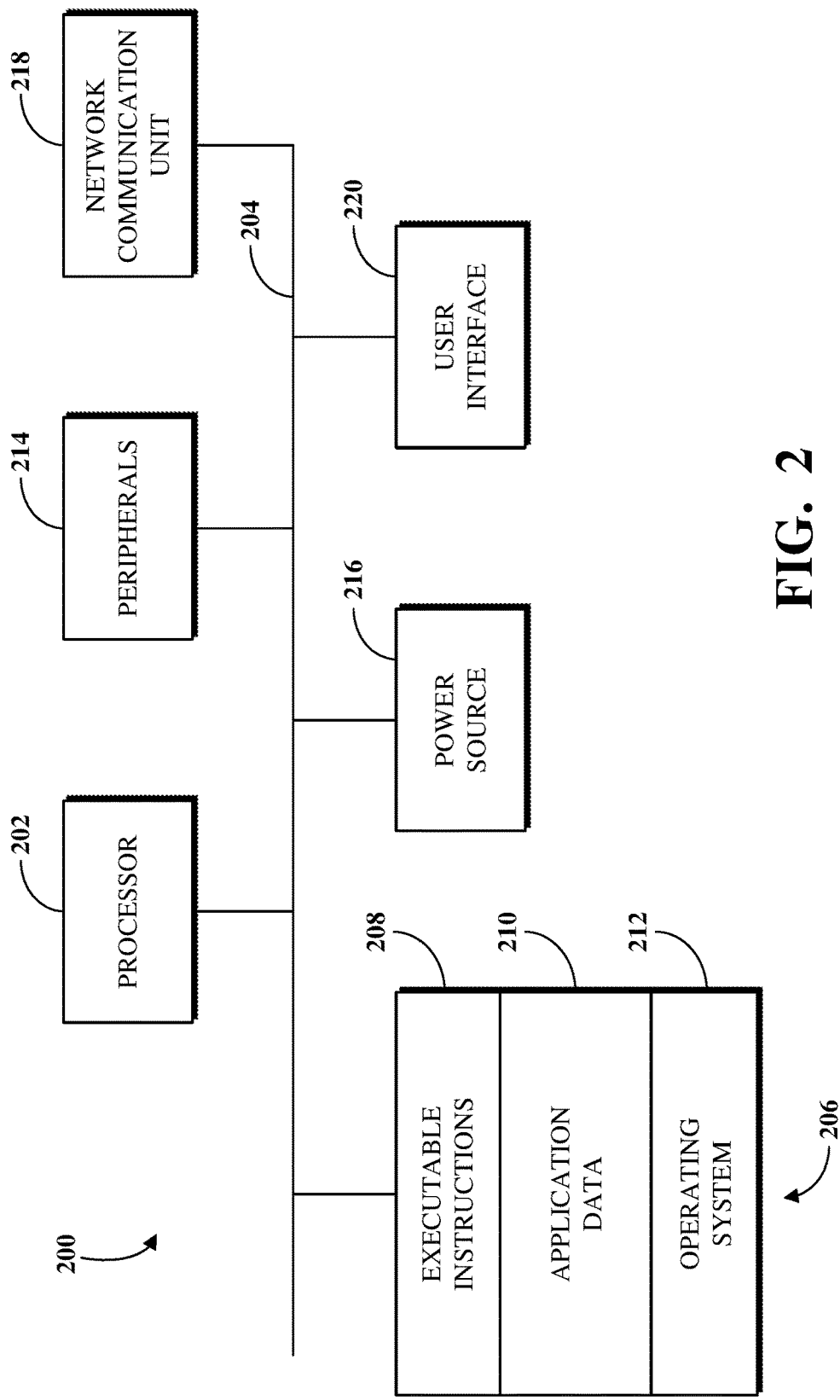
FIG. 2 is a block diagram of an example internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing.

As used herein, the term "network flow" can refer to information indicative of traffic within a computer network (e.g., data packets transmitted by a computer network), and can include or be used to determine a connection between a pair of components of the computer network. A network flow can, for example, include information about the IP addresses and ports of components used to send and receive data packets in the computer network. A network flow can also, for example, refer to the one or more data packets sent from a source component to a destination component, characteristics of network traffic monitored within the computer network (e.g., a number of connections between pairs of components, amounts of computer network bandwidth used to send data packets between components, or the like, or combinations thereof), or information associated with the transmission or receipt of data within the computer network (e.g., transport layer protocols, Internet layer protocols, or the like, or combinations thereof). Data associated with a network flow can be obtained using network protocols (e.g., NetFlow, sFlow, cFlow, or the like, or combinations thereof), flow logs (e.g., of a virtual private cloud (VPC), such as a third-party SaaS service provider, subnets, or network interfaces), packet sniffers or analyzers intercepting network traffic within a computer network, or the like or combinations thereof.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of an application running on a customer device associated with the customer 102. As used herein, the term "software" can include, but is not limited to, applications, programs, instances, processes, threads, services, plugins, patches, application version upgrades, or any other identifiable computational aspect. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of CIs, attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although depicted here as a single bus, the bus 204 can be composed of multiple buses, which can be connected to one another through various bridges, controllers, or adapters.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to identify connections between components of a computer network, determine sequences of the identified connections, and infer attributes of at least some components of the computer network based on the determined sequences of identified connections.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
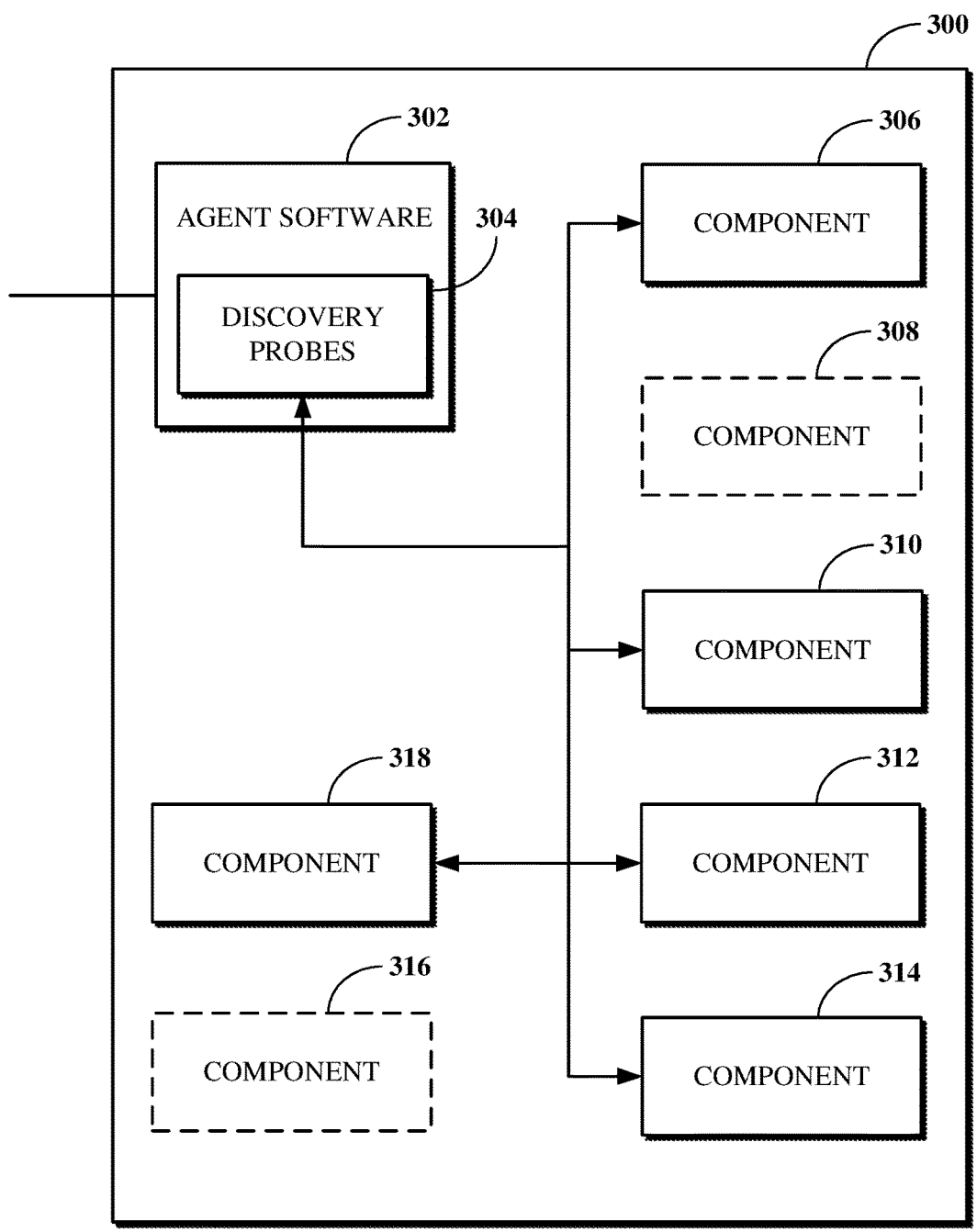
FIG. 3 is a block diagram of an example of a system for identifying components of a computer network.

FIG. 3 is a block diagram of an example of a system for identifying components of a computer network 300. The computer network 300 can operate within a customer environment, such as a customer 102 (also referred to as a customer environment 102) of the system 100 shown in FIG. 1. The customer environment can include one or more computer networks. As such, the computer network 300 includes hardware and software components under the partial or total control of the customer environment, such as the components 306, 308, 310, 312, 314, 316, and 318. For example, one or more of the components 306, 308, 310, 312, 314, 316, and 318 can be a hardware device operating at a physical location controlled by a customer, software executing on such a hardware device, software executing on other devices operating at physical locations not controlled by the customer (e.g., cloud services executing on server devices of a third-party SaaS provider environment), virtual machines implementing software in a customer environment, or the like, or combinations thereof.

The computer network 300 includes agent software 302 that facilitates the communication and movement of data between software executing outside of the computer network 300 (e.g., outside of the customer environment in which the computer network 300 is located) and hardware or software executing within the computer network 300. The customer environment includes a firewall that prevents components of a provider environment (e.g., server devices operating at a datacenter, such as the datacenter 108 shown in FIG. 1) from accessing components of the customer environment. The agent software 302 can open up a connection between one or more components of the provider environment and one or more components in the computer network of the customer environment in which the agent software 302 executes. For example, the provider environment can include a database storing a table of messages to be sent to the customer environment. The agent software 302 can check if any messages are waiting to be sent and, if so, open up a connection through the firewall of the customer environment to allow one or more of the pending messages to be sent to components within the customer environment. Such communication and movement of data between software executing outside of the computer network 300 and hardware or software executing within the computer network 300 can be facilitated, for example, using MID server software provided by ServiceNow, Inc. of Santa Clara, Calif.

The agent software 302 executes on a hardware component within or accessible by the computer network 300 (e.g., a server device). The agent software 302 can perform operations to identify hardware or software components of the computer network 300. The operations performable by the agent software 302 include running one or more discovery probes 304 against components of the computer network 300 to gather information about those components. The discovery probes 304 can be received by the agent software 302 from platform software executing in a datacenter operated by a provider of a PaaS service, such as the datacenter 108 shown in FIG. 1. The platform software is executed on a server in a distributed computing system accessible by components of the customer environment that includes the computer network 300. For example, the platform software can execute on one or more application nodes, such as the application node 114 shown in FIG. 1, and store data in one or more database, such as the database 118 shown in FIG. 1.

Steps of a discovery probe 304 include one or more commands that can be processed by the agent software 302 to identify attributes of components of the computer network 300, for example, attributes related to the status or configuration of those components. A discovery probe 304 is configured to communicate with a component of the computer network 300 using a compatible language or interface, such as SSH, Windows Management Instrumentation (WMI), or the like. For example, a step can be implemented using SSH and the command ipconfig for identifying network address or authentication attributes (e.g., credentials) for the subject component. When the step is processed, the component can be logged into using SSH for the agent software 302 to retrieve further attribute information about the component using the subject discovery probe 304, such as by executing other commands against or retrieving a file associated with the component.

Information about attributes of components of the computer network 300 identified using the discovery probes 304 is transmitted from the agent software 302 to the platform software. The platform software can access a database, such as a CMDB, including records of the components of the computer network 300. For example, the CMDB accessible by the platform software can include CIs representative of respective components identified via a discovery probe 304. A CI for an identified component can include attributes of the component, which attributes are also identifiable via a discovery probe 304. For example, a discovery probe for an Apache Tomcat® web server (Tomcat or "Tomcat web server") can identify attributes of the Tomcat, including a Web Application Archive (WAR) file executed by the Tomcat, an IP address of the Tomcat, a version of Linux operating the Tomcat, or the like, or combinations thereof. A CI can then be generated for the Tomcat (or, if a CI therefor already exists, it can be updated) within the CMDB using the attribute information obtained via the discovery probe 304.

As shown in FIG. 3, the agent software 302 executes discovery probes 304 for identifying attributes of the components 306, 310, 312, 314, and 318. The components 306, 310, 312, 314, and 318 can be the same component having attributes identifiable via a single discovery probe 304. Alternatively, the components 306, 310, 312, 314, and 318 can each be different components having attributes identifiable via a same number of different discovery probes 304. Further alternatively, some, but not all, of the components 306, 310, 312, 314, and 318 can be the same component as others of the components 306, 310, 312, 314, and 318, such that a same discovery probe 304 can be used to identify attributes of more than one of the components 306, 310, 312, 314, and 318.

However, the attributes of certain other components of the computer network 300 might not be identified by running the discovery probes 304. As shown in FIG. 3, the components 308 and 316 have attributes that might not be identifiable by the discovery probes 304 run by the agent software 302. This can be due to the credentials for the components 308 and 316 being unknown such that the discovery probes 304 are unable to access information about those components. It could also be due to other reasons, for example, the discovery probes 304 not including commands executable against the components 308 and 316. Attributes of the components 308 and 316 might not be identifiable by running the discovery probes against them even if a CMDB accessible by the platform software already includes CIs representing the components 308 and 316.

Implementations of the system depicted in FIG. 3 can include additional, less, or combined functionality as compared to that described above, or functionality other than that described above, or combinations thereof. In some implementations, one or more discovery probes 304 can be run as part of a technique for identifying components that connect to provide a software service of the computer network. For example, a discovery probe 304 can reference a host, protocol, port, URL, or other set of parameters that indicates a first component accessed (e.g., by a client 104) within the computer network 300 for a given software service, which software service can, for example, be a web application, an email service, or other software executable within the computer network 300. A first CI representative of the first component can be identified, created, or updated in a CMDB accessible by the platform software (or other management software, as applicable) based on the information obtained via the discovery probe 304. Based on information received from the discovery probe 304 to the first component, additional components can be identified that the first component uses to provide the software service. Additional discovery probes 304 can be sent to the additional components. Additional CIs can be identified, created, or updated in the CMDB based on the information obtained from the additional discovery probes 304. The first CI can be identified as a parent CI of the additional CIs in the CMDB. Further discovery probes can be recursively or iteratively sent to components identified that the additional components use to provide the software services and further components identified, such as from the further discovery probes. Further CIs and relationships between CIs can be identified, created, or updated in the CMDB based on the information obtained using this recursive or iterative process. The software service can thus be determined to be provided by the first component and additional and further components of the computer network 300 represented in the CMDB by the additional and further CIs.

The agent software 302 can receive the discovery probes 304 from management software other than platform software. For example, the management software from which the discovery probes 304 are received can be other software executing within a datacenter, such as software associated with an SaaS provider environment. In another example, the management software from which the discovery probes 304 are received can be software executing independently from a datacenter, such as on-premises software used to manage a model of the computer network 300. In some implementations, the management or platform software can send discovery probes directly. For example, a discovery probe might be directed to another cloud provider (e.g., Amazon Web Services or the like) that may be accessible from the management or platform software.

The agent software 302 can generate the discovery probes 304 and send them using information received from the platform software (or other management software, as applicable) or responsive to an event. For example, the instructions for implementing the discovery probe may be retrieved or generated based on an identifier of a discovery probe 304. In another example, the instructions for implementing a discovery probe 304 can be selected or generated based in part on an identifier of the target device or information about a type of the target device. In another example, a discovery probe 304 can be initiated responsive to the agent software 302 receiving a command from the platform software (or other management software, as applicable). In another example, a discovery probe 304 can be initiated when a timer expires or upon the occurrence of some other triggering event.

One or more discovery probes 304 can be run by a specified proxy or a dynamic proxy instead of the agent software 302. For example, modules for processing discovery probes 304 against components of the computer network 300 and returning information retrieved using the discovery probes 304 can be implemented within the computer network 300. The agent software 302 can cause the modules to execute to process one or more discovery probes 304, for example, responsive to the discovery probes 304, or commands to run the discovery probes 304, being received from the platform software. As such, a request to run a discovery probe 304 can be intercepted by such a module, a transmission of information retrieved from a discovery probe 304 can be intercepted by such a module, or the like, or combinations thereof.

The discovery probes 304 can be run against the components 306, 310, 312, 314, and 318 to identify those components within the computer network 300 rather than or in addition to identifying various attributes thereof. For example, the discovery probes 304 can include instructions to identify hardware or software components that have not yet been identified within the computer network 300 (e.g., where the then-unidentified components were installed or executed after a most recent time the discovery probes 304 were run against the computer network 300). In this way, the results of the discovery probes 304 can include data usable to generate CIs for each of the components 306, 310, 312, 314, and 318.

However, the discovery probes 304 might be unable to identify certain components or certain attributes of certain components of the computer network, such as the components 308 and 316. As such, the components 308 and 316 might not be identified (or attributes of the components 308 and 316 might not be identified, as the case may be) by running the discovery probes 304, such that no CI is generated for either of the component 308 or the component 316 or certain attributes are not discovered and thus not stored or associated with a CI for the component 308 or the component 316.

Figure 4:
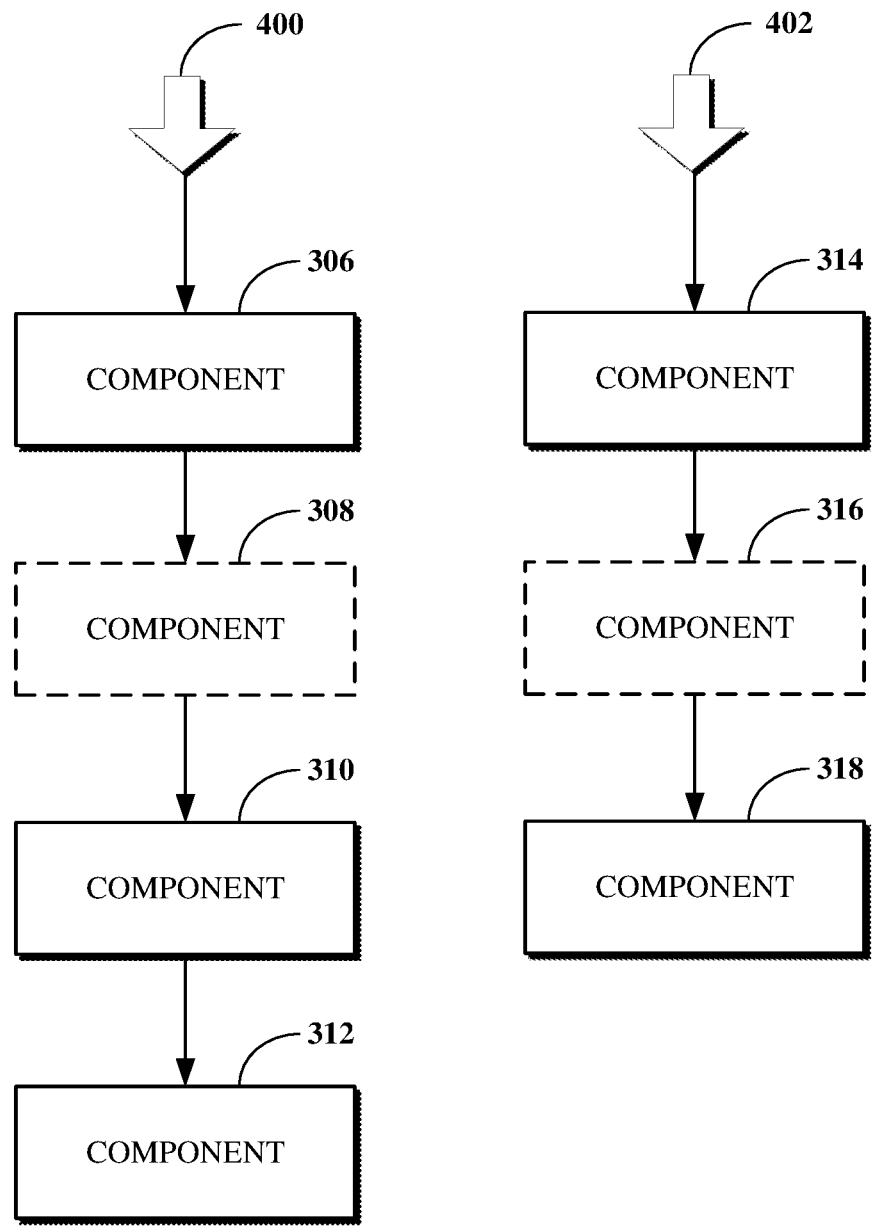
FIG. 4 is a block diagram of an example of connections between components of a computer network involved in processing client requests within the computer network.

FIG. 4 is a block diagram of an example of connections between components of a computer network involved in processing client requests within the computer network. Components of the computer network, such as the computer network 300 shown in FIG. 3, can be accessed by clients of the customer environment, such as the client 104 of the customer 102 shown in FIG. 1. A client can access a component of the computer network by making a request 400, 402 therefor. For example, a request 400, 402 from a client can be or include a request for a host, protocol, port, URL, or other set of parameters that indicates a location of a component of the computer network. The component having the indicated location can connect with (e.g., transmit data to, receive data from, or a combination thereof) other components of the computer network to implement software services within the computer network. As such, a request 400, 402 can be processed to indicate how a software service is consumed via a web service within the computer network.

As shown in FIG. 4, a first request 400 from a client can identify the component 306 within the computer network. The component 306 can connect to other components within the computer network, such as the component 308. The component 308 can connect to the component 310, and the component 310 can connect to the component 312. The components 306, 310, 312, and 308 and the connections between them can be used to, for example, provide a software service of the computer network. The order in which the components 310, 312, and 308 connect to the component 306 can depend upon the types of those components and the service for which the first request 400 is made. Some of the components may be discoverable or may not be discoverable, such as described above with respect to FIG. 3. For example, the component 308 might not be identifiable through discovery or can have attributes not identifiable through discovery (e.g., where credentials are not available for the component 308). For example, the components 306, 310, and 312 can be indicated as being discovered (e.g., where credentials are available for the components 306, 310, and 312).

For example, where the first request 400 is a request to access a virtual machine instance within the computer network, the component 306 can be, for example, the virtual machine instance. The component 308 can be, for example, application software operating on the virtual machine instance. The component 310 can be, for example, a server device used by the application software and component 312 can be, for example, database software executing on the server device that is used by the application software. In such an example, the application software component 308 may not be discoverable because credentials are not available for the virtual machine instance, whereas the database software component 312 may be discoverable because credentials are available for the server device.

Similarly, a second request 402 from a client (which can be the same as or distinct from the client that made the request 400) can indicate a location of the component 314 within the computer network. The component 314 can also connect to the component 316, which component 316 has attributes that were not identified via the discovery probes 304. The component 316 can connect to the component 318, which component 318 has attributes that were identified via one or more discovery probes run against it. Accordingly, the components 314, 316, and 318 can be said to connect to provide a second software service within the computer network. The order in which the components 316 and 318 connect to the component 314 can depend upon the types of those components and the service for which the request 402 is made.

For example, where the second request 402 is a request for a webpage (e.g., a URL received by a server), the component 314 can be a Nginx load balancer for directing the request to an appropriate web server configured to process the request by loading the webpage. The component 316 can be the Tomcat web server, which receives the request from the load balancer and queries data used to load the webpage from a database. The component 318 can be an Oracle database server operating the database to which the Tomcat web server sent its query. While certain attributes of the component 316 might be known (e.g., basic information about the component 316, such as its IP address, previously identified such as by pinging it during a previously performed discovery operation within the computer network 300), the identity of the component 316 as a Tomcat web server might not be known without credentials or further information about how the component 316 is used within the computer network 300.

Implementations of the connections or components depicted in FIG. 4 can include additional, less, or combined functionality as compared to that described above, or functionality other than that described above, or combinations thereof. In some implementations, a request 400, 402 can represent a discovery probe run by agent software executing within the computer network to identify the components that connect to provide a software service of the computer network. For example, and as discussed with respect to FIG. 3, the agent software can run a discovery probe to identify a first component of the computer network and subsequently identify a CI representing that first component within a CMDB. Children CIs connected to the CI representing the first component can then be identified. For example, a request 402 can be made by a discovery probe to identify the component 314, such that a CI representative of the component 314 is identified in a CMDB. A CI representative of the component 318 is identified as a child CI of the CI representative of the component 314. Further, partial records within the CMDB, such as those including information obtained from performing previous discovery operations (e.g., network-based discovery operations for identifying network subnets associated with routers, or the like) can indicate attributes of unidentified components of the computer network. For example, a partial record (e.g., a CI missing information about the component it represents) can indicate that some component having a particular IP address is located in between the components 314 and 318 when facilitating the request 402.

Figure 5:
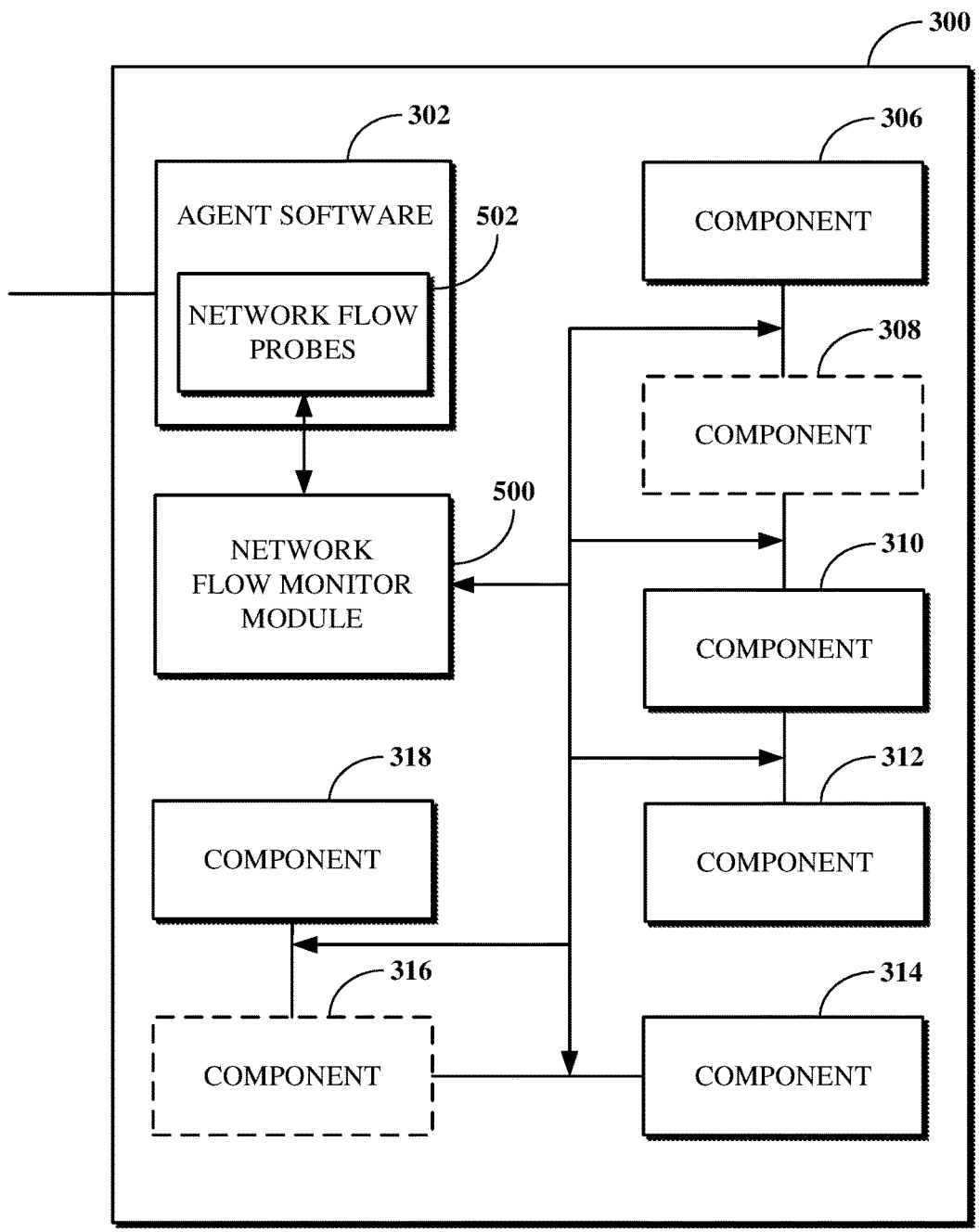
FIG. 5 is a block diagram of an example of a system for identifying connections between components of a computer network.

FIG. 5 is a block diagram of an example of a system for identifying connections between components of a computer network, such as the computer network shown in FIG. 3. The computer network 300 includes a network flow monitor module 500 executing on a device connected to the computer network 300 (e.g., the device executing the agent software 302 or another device). For example, the network flow monitor module 500 can be a NetFlow collector (e.g., Flow Collector) executing on a router within the computer network 300. The agent software 302 receives the network flow probes 502 in a manner similar to that in which the agent software 302 receives the discovery probes discussed with respect to FIG. 3 (e.g., from platform software executing on a server in a datacenter, such as the datacenter 108 shown in FIG. 1, or other management software, as applicable). For example, a network flow probe 502 can be implemented using a script executable by the agent software 302, which script can have a definition stored within a database accessible by the platform software. The definition of the script can include configurable parameters for obtaining network flow data (which configurable parameters are later described), such that the script can use the configurable parameters to selectively collect network flow data from one or more sources, such as routers operating in the computer network 300.

The network flow monitor module 500 can use the network flow probes 502 to identify information indicating connections between components of the computer network 300. The connection information identified by the network flow monitor module 500 can be used to identify attributes of components (or to identify components) that were not identifiable via discovery probes run against the computer network 300.

The network flow probes 502 can be received via a scheduled job executing in connection with the platform software (or other management software, as applicable), which scheduled job schedules a collection of network flow data within the customer environment using the network flow probes 502. The network flow probes 502 can be received within the customer environment according to a schedule indicated by a network flow profile generated for the agent software 302. The network flow profile is processed by the platform software or other management software to send the network flow probes 502 to the agent software 302 at certain times. For example, an administrator of the customer environment can create, update, or configure the network flow profile to be associated with the agent software 302. The administrator or other user can then configure a schedule or other parameters for the agent software 302 to receive and run the network flow probes 502 associated with the network flow profile. For example, the network flow profile can be configured to send network flow probes 502 to be run by the agent software 302 once an hour. In another example, the network flow profile can be configured to send network flow probes 502 that cause the network flow monitor module 500 to not identify connections between components of the computer network 300 over a port in which attribute information can otherwise be obtained (e.g., SSH, DNS, NetBIOS, AD, ISCSI, or the like). In another example, the network flow profile can be configured to indicate a location at which to store data retrieved responsive to running one or more network flow probes 502 against the computer network 300.

As such, the network flow probes 502 can indicate a manner in which the network flow monitor module 500 collects information about the connections between components of the computer network 300. The network flow monitor module 500 can use the configurations of the network flow probes 502 to record network flows within the computer network. A recorded network flow can indicate a source IP address and a source port from which a data packet is sent and a destination IP address and a destination port at which the data packet is received. The various IP addresses and ports indicated by the recorded network flows can be compared to identified attributes of components of the computer network 300 to identify a first component that is the source in the network flow and a second component that is the destination in the network flow.

As shown in FIG. 5, the network flow monitor module 500 can use the network flow probes 502 to identify connections between the components 306 and 308, the components 308 and 310, the components 310 and 312, the components 314 and 318, and the components 316 and 318. The respective connections can be used to identify components, or attributes of components, that were not identified by a discovery operation (e.g., using the discovery probes 304 shown in FIG. 3). A component not previously identified by a discovery operation can be identified by comparing the source and destination IP addresses and ports in the collected network flow data to piece together a sequence of connections showing how a plurality of components communicate with one another. CIs representative of the previously identified components can be identified in a CMDB, and previously unidentified components can be determined, based on the ordering of the source and destination IP addresses and ports in the network flow data.

For example, and as shown in FIG. 5, the network flow monitor module 500 can collect network flow data indicating that the IP address of the component 314 (an identified component) sends data to a port of some other component in the computer network having an IP address, which port and IP address of the other component are indicated by the network flow data. The network flow data can further indicate that that other component sends data to a port of the component 318, which has a known IP address. A first CI having the IP address of the component 314 can be identified within the CMDB. A third CI having the IP address of the component 318 can be identified as a CI that is connected to the first CI via an intermediate second CI. Upon a determination that the second CI has the IP address of the other component indicated by the network flow data, the component represented by the second CI can be identified as the component 316. Information indicating the ports of the respective components can also be used to identify the respective CIs or to support a conclusion that a particular CI represents a particular component.

Implementations of the system depicted in FIG. 5 can include additional, less, or combined functionality as compared to that described above, or functionality other than that described above, or combinations thereof. In some implementations, the network flow monitor module 500 can collect network flow data using one or more network protocols or flow logs. For example, the network flow monitor module 500 can include a collector compatible with protocols such as NetFlow, sFlow, cFlow, or the like, or combinations thereof. In another example, the network flow monitor module 500 can retrieve flow logs generated within a VPC or other environment external to the customer environment (e.g., using NMap). In some implementations, the network flow monitor module 500 can be a packet sniffer for intercepting network flows occurring within the computer network 300.

A network flow profile may include a reference to an orchestration script executable by the agent software 302. The orchestration script orchestrates the logic (e.g., the definitions of the scheduling and parameters) for causing the agent software 302 to execute the network flow probes 502 within the computer network 300 and allows an administrator or other user of the computer network 300 to customize such logic. The script can execute via a command line on a device executing the agent software 302 within the computer network 300, or on another device connected to the device executing the agent software 302. A database accessible by the platform software or other management software can include a database table that serves as an intermediary store for data being sent from the platform software or other management software to the computer network 300 or vice versa.

The platform software or other management software can use a network flow profile to send instructions (e.g., via a first record that the platform software or other management software causes to be stored in the database table) to the agent software 302 to run one or more network flow probes 502 according to a particular schedule or using particular parameters. For example, the orchestration script, when executed by the agent software 302, can cause the network flow monitor module 500 of the computer network 300 to identify connections between the components of the computer network 300. The orchestration script can then cause information about the identified connections to be sent from the agent software 302 to the platform software or other management software (e.g., via a second record that the agent software 302 causes to be stored in the database table). For example, the orchestration script can store the information in a JSON file referenced by the second record. In some implementations, the JSON file can be associated with the network flow profile, for example, as historical data collected using the network flow probes 502. In some implementations, such as where the determination of a sequence of connections is made by the agent software 302 instead of the platform software or other management software, the JSON file can also or instead include information indicating the determined sequence.

Network flow probes can be used for the retrieval of data from sources other than a network flow collector (e.g., the network flow monitor module 500) executing in the computer network 300. For example, data usable for inferring attributes of components for which credentials are not available can be obtained using an nfdump command execution, an nfdump output file, VPC flow logs (e.g., Amazon Web Services VPC operating in the EC2 cloud), or the like, or combinations thereof. For example, the agent software 302 can include nfcapd or nfdump functionality that runs nfdump on collected network flow data to analyze results thereof. As follows is a portion of an example script for running nfdump:

```
execute: function( ) {
    var command = this.exe_path + "nfdump -q -o extended -R" +
this.data_path + this.time_filter + " " + this.filter + " > " +
this.dump_file_path;
    ms.log('Executing command:' + command);
    var shellRunner = new Runner( );
    shellRunner.runCommand(command);
    if (shellRunner.getError( )) {
        this.error('ERROR running nfdump: ' +
        shellRunner/getError( ));
    }
    var nfdumpParser = new NfdumpParser( );
    ms.log('parsing nfdump file: ' + this.dump_file_path);
        nfdumpParser.setParameters(probe.getParameters( ));
    nfdumpParser.parseFile(Paths.get(this.dump_file_path));
    ms.log('nfdump parsing success')
    return nfdumpParser.toJson( );
}
```

In some implementations, a form can be provided on a graphical user interface displayed by a client device used by the network administrator for configuring the nfdump functionality for a computer network 300 within a customer environment. For example, the form can include fields for receiving user input in regards to a name of an nfdump operation, a script file to be executed in connection with the nfdump, a schedule (e.g., expressed in seconds) for running the nfdump operation, the agent software 302 associated with the computer network 300 in which the network flow data is being collected, a directory or other file path for an output file (e.g., the JSON file discussed above) to be generated responsive to the nfdump operation, a directory or other file path for an nfdump executable, and an nfdump filter expression used during the nfdump operation (e.g., inet and proto tcp).

The collected network flow data can be used to create placeholder CIs within a CMDB to temporarily represent components for which credentials are not available and for which attributes are not yet known (in whole or in part). For example, the placeholder CIs can have general attributes associated with TCP connections (e.g., IP address, port, or the like). A placeholder CI can be created in a location relative to CIs representing components that connect to the unidentified component represented by the placeholder CI. For example, a placeholder CI created to represent the component 316 within a CMDB can be a child of the parent CI representing the component 314. That placeholder CI can be a parent CI of a child CI representing the component 318 within the CMDB. Upon further information being obtained or inferred about the component 316 (e.g., by credentials therefor becoming available, attributes being inferred based on determined sequences of connections, or the like), the placeholder CI can be updated with the new information about the component 316. Alternatively, the placeholder CI can be replaced with a new CI created to represent the component 316 according to the attributes specific to the component 316.

Figure 6:
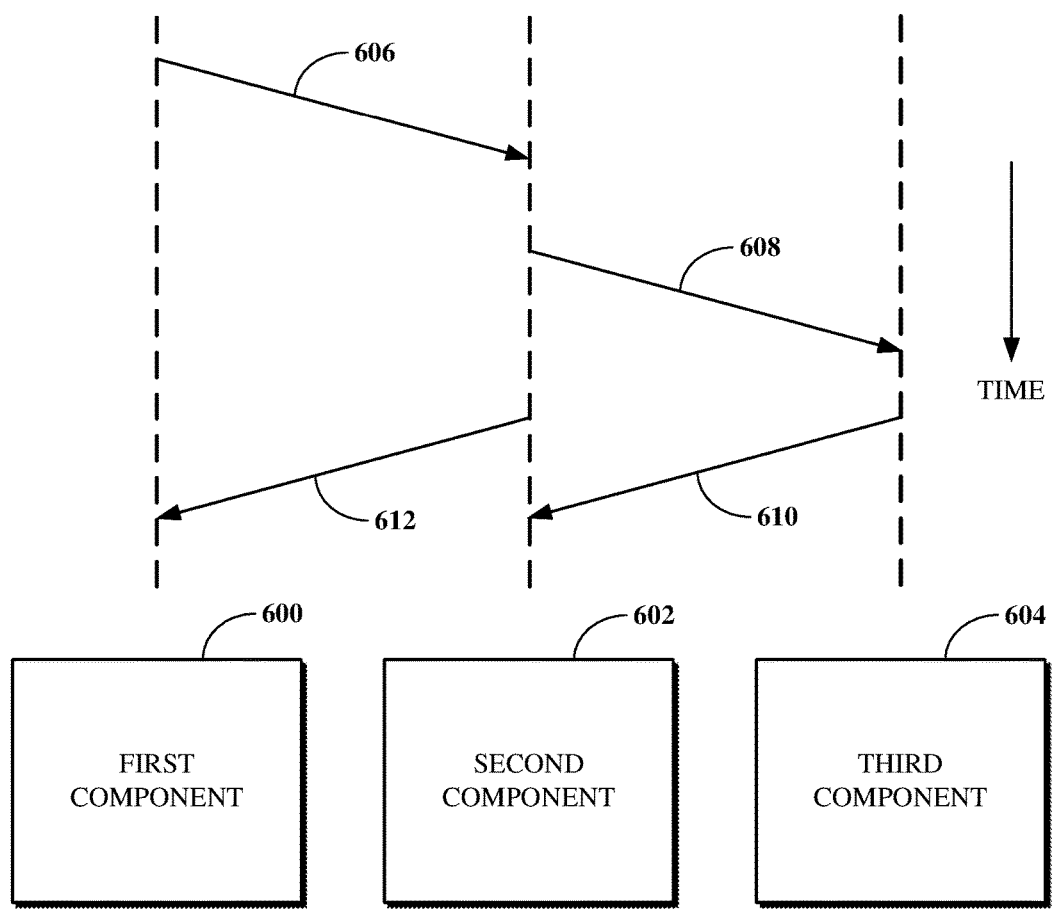
FIG. 6 is a diagram of an example of a sequence of connections determined based on connections between components of a computer network.

FIG. 6 is a diagram of an example of a sequence of connections determined based on connections between components of a computer network. The connections 606, 608, 610, and 612 are identified between a first component 600, a second component 602, and a third component 604 of the computer network. The connections 606, 608, 610, and 612 show how data is communicated between the first component 600, the second component 602, and the third component 604 over some period of time. In particular, the first identified connection 606 shows data being sent from the first component 600 to the second component 602. The second identified connection 608 shows data being sent from the second component 602 to the third component 604, such as in response to the first connection 606. The third identified connection 610 shows data being sent from the third component 604 to the second component 602, such as in response to the second connection 608. The fourth identified connection 612 shows data being sent from the second component 602 to the first component 600, such as in response to the first connection 606.

For example, the connections 606, 608, 610, 612 can indicate how components of the computer network connect responsive to a client request to access a website, in which the first component 600 is a Nginx load balancer, the second component 602 is an Apache web server (e.g., a Tomcat web server), and the third component 604 is an Oracle database server. The request can originate from a user of the client entering a URL in a web browser executing on the client. The request can be sent to the load balancer, which can connect to the Tomcat web server over port 80 of the Tomcat web server via the connection 606. The Tomcat web server can then connect to the Oracle database server over port 1521 of the Oracle database server via the connection 608. The Tomcat web server is configured to process the request by loading a webpage associated with the URL by retrieving data stored in a database operating on the Oracle database server. The data retrieved from the database can be sent from the Oracle database server back to the Tomcat web server via the connection 610. However, the client request can be responded to by the Tomcat web server sending at least a portion of the webpage to the load balancer via the connection 612 at the same time as the Oracle database server sends the retrieved data to the Tomcat web server. In another example, the webpage and data retrieved from the Oracle database server can be sent from the Tomcat web server to the Nginx load balancer via the connection 612 after the connection 610. The Nginx load balancer can complete the request by sending the Tomcat webpage and data retrieved from the Oracle database server to the client.

As such, the connections 606, 608, 610, 612, which can be identified by the network flow monitor module 500 shown in FIG. 5, indicate sequences of connections between the first component 600, the second component 602, and the third component 604. For example, one sequence of connections can be indicated by the first two connections 606 and 608 and thus shows a sequence of connections originating with the first component 600 and terminating at the third component 604 (e.g., as a sequence of connections for receiving or processing the client request for the URL by querying the data from the database). In another example, a sequence of connections can be indicated by the connections 606 and 612 or by the connections 608 and 610 as a sequence of connections for partially processing and partially responding to a client request (e.g., respectively, as a sequence of connections for identifying a requested webpage at a web server or a sequence of connections for retrieving data associated with the webpage from a database). In another example, where the connection 612 occurs after the connection 610 (e.g., where the third component 604 sends data to the second component 602 before the second component 602 sends data to the first component 600), a sequence of connections can be indicated by all four of the connections 606, 608, 610, and 612 and thus shows a sequence of connections originating with and terminating at the first component 600 (e.g., as a sequence of connections for receiving or processing the client request for the URL and responding to it with the webpage and database data). Other sequences of connections, such as a sequence of connections indicated by the connections 606, 608, and 610, or a sequence of connections indicated by the connections 606, 608, and 612, can also be determined.

A sequence of connections can be used to infer attributes of components of the computer network not already identified, for example, because credentials are unavailable for logging into those components. For example, network flow data can be collected in the computer network (e.g., by the network flow monitor module 500 shown in FIG. 5) and filtered to remove information about components for which credentials are available (e.g., by removing network flow data associated with known ports, such as SSH, DNS, NetBIOS, AD, ISCSI, or the like). Servers associated with the collected network flow data can then be inferred to determine a sequence of connections. For example, where the first component 600 is known to send data to the second component 602 and the second component 602 is known to send data to a third component 604, it can be inferred that the second component 602 is a server. The number of times a particular connection (e.g., an individual connection, such as between the first component 600 and the second component 602) is identified within the network flow data can be counted using a sliding window (described later with respect to FIG. 7) to deduce the dependencies between the identified connections. For example, the number of times that the first component 600 sends data to port 80 of the second component 602 can be counted as a first value M and the number of times that the second component 602 sends data to port 90 of the third component 604 can be counted as a second value N. If the ratio of M/N is greater than a configurable threshold value (e.g., 0.3), a sequence of connections can be determined between the first component 600 and the third component 604 (e.g., via port 80 of the second component 602 and port 80 of the third component 604).

Implementations of the sequences of connections described with respect to FIG. 6 can include additional, less, or combined functionality as described above, or functionality other than that described above, or combinations thereof. In some implementations, data other than the IP addresses and ports of a source component and a destination component can be used to determine sequences of identified connections. For example, information indicating the size of a data packet sent from the source component to the destination component can be used to identify further connections in the corresponding sequence of connections. That is, where the size of a data packet sent in a first connection is X and the size of a data packet sent in a second connection is Y, it can be deduced that the second connection might not follow the first connection; however, where the size of a data packet sent in a third connection is also X, it can be deduced that the third connection might follow the first connection. As such, a sequence of connections might be determined based on the first connection and the third connection. In another example, a flag indicating a common component for routing data (e.g., a load balancer) between components associated with the identified connections can be used to show that such routed data follows a sequence of connections.

In another example, information about the times at which data packets associated with identified connections are sent and received within the computer network can be used to determine sequences. A timer or like computational aspect can record timestamps indicating when the data packet is sent from a source component and received by a destination component. The time at which a first data packet is received can be compared to the time at which a second data packet is sent. If the second data packet is sent before the first data packet is received, it can be determined that there is no sequence of connections between the components that send and receive the first and second data packets. However, if the first data packet is received before the second data packet is sent, it might be possible to determine a sequence of connections between the respective components. Other examples of information usable to determine sequences of identified connections include flags indicating common load balancers used to route identified connections, flags indicating TCP as a transport layer protocol used for identified connections, instructions such as to process identified connections within a particular time interval (e.g., determine sequences using only those connections identified within one second of one another), or the like, or combinations thereof.

In some implementations, a sequence of connection can be determined by cross-referencing identified connections with CIs representing corresponding components in a CMDB. For example, discovery operations might have previously been performed to identify the first component 600 as a load balancer and the third component 604 as a database server; however, the second component 602 might not have been identified by the discovery operations. Network flow data monitored within the computer network (e.g., using the network flow monitor module 500 shown in FIG. 5) can indicate that the load balancer is sending data to an unidentified component and that the database server is receiving data from an unidentified component. A CMDB associated with the computer network can be queried for CIs associated with the load balancer and the database server (e.g., using IP addresses or ports of those components, as indicated by the network flow data, to identify CIs in the CMDB having those IP addresses as attributes).

It can thus be determined that the CI representing the load balancer and the CI representing the database server have an intermediate CI in between and connecting them. Attributes of that intermediate CI can be identified to determine what the component is that is represented by it. For example, the attributes for that CI can indicate that it executes a WAR file and runs a particular build of a Linux operating system. In another example, the attributes for that CI can explicitly indicate that it represents a web server. The second component 602 can thus be identified as a web server such that a sequence of connections between the first component 600, the second component 602, and the third component 604 can be determined.

In some implementations, a module executing on a server device at a datacenter or on a device within the computer network (or other part of a customer environment) can traverse a sequence of identified connections to determine a final component to which data is eventually sent in connection with a request associated with the sequence. For example, where the sequence of identified connections indicates four connected components, the module can use the information about those four components to identify corresponding CIs in a CMDB. The module can follow a hierarchical connection (e.g., set of parent-child relationships) including those CIs to a final child CI. The module can identify the other components associated with the CIs in the hierarchical connection, for example, to determine other components for which credentials are unavailable. In another example, the module can query a table including the relevant information about the components involved in the above-described hierarchical connection.

Figure 7:
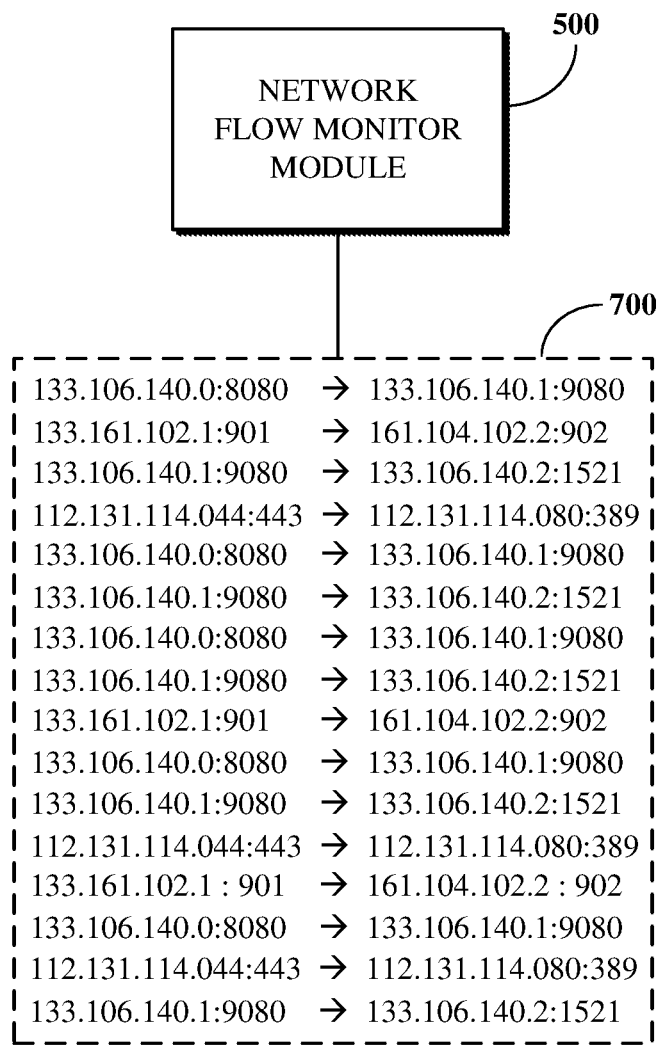
FIG. 7 is a diagram of an example of network flow data collected within a computer network.

FIG. 7 is a diagram of an example of network flow data 700 collected within a computer network. The network flow data 700 (e.g., collected using a network flow monitor module 500, as described with respect to FIG. 5) includes a log of connections between components of the computer network. An entry in the log of the network flow data 700 indicates a pair of components connected within the computer network. The pair of components includes a source component, which sends data as part of a connection, and a destination component, which receives the data sent from the source component.

The source component is indicated by a source IP address and a source port, whereas the destination component is indicated by a destination IP address and a destination port. As shown in FIG. 7, source IP addresses and source ports are shown on the left side of the arrows representing network flows within the computer network, and destination IP addresses and destination ports are shown the right sides thereof. Sequences of identified connections, such as discussed with respect to FIG. 6, can be determined by comparing the destination IP address and destination port of a first connection to the source IP address and source port of a second connection. If there is a match, it is possible that there is a sequence between the components of the first connection and those of the second connection.

The network flow data 700 can be collected using a sliding window of the network flow monitor module 500.

The sliding window can divide portions of the network flow data to be processed into discrete periods of time (e.g., five second intervals). Because there can be a very large number of network flows occurring within a computer network at a given time, the ability to process the network flow data in smaller chunks of time can allow the system to filter out irrelevant network flow data, given that the connections used to determine sequences are likely to be recorded within a near time of one another. It can also reduce the computational resources needed to process the network flow data.

Implementations of collecting or using the network flow data 700 depicted in FIG. 7 can include additional, less, or combined functionality as described above, or functionality other than that described above, or combinations thereof. In some implementations, the sliding window can be used to collect network flow data in overlapping periods of time, rather than discrete periods of time. For example, the network flow monitor module 500 can record a first log of network flow data processed from time 0 to time 10 and a second log of network flow data processed from time 7 to time 17. As such, data representing network flows processed between time 7 and time 10 would appear in both the first log and the second log.

In some implementations, the sliding window can have dynamic sizing such that the length of time monitored to record a first log can differ from the length of time monitored to record a second long. For example, the network flow monitor module 500 can record the first log of network flow data within a thirty second window, whereas the network flow monitor module 500 can record the second log of data within a sixty second window. The thirty second window and the sixty second window can be discrete or can overlap. In some implementations, two sliding windows can be used to collect network flow data within the computer network. A first sliding window can be a larger sliding window that sorts collected network flows based on time, and a second sliding window can be a smaller sliding window usable to filter irrelevant network flow data (e.g., by filtering out network flow data associated with components for which credentials are available, such as by connections over known ports, for example, SSH, DNS, NetBIOS, AD, ISCSI, or the like).

Figure 8:
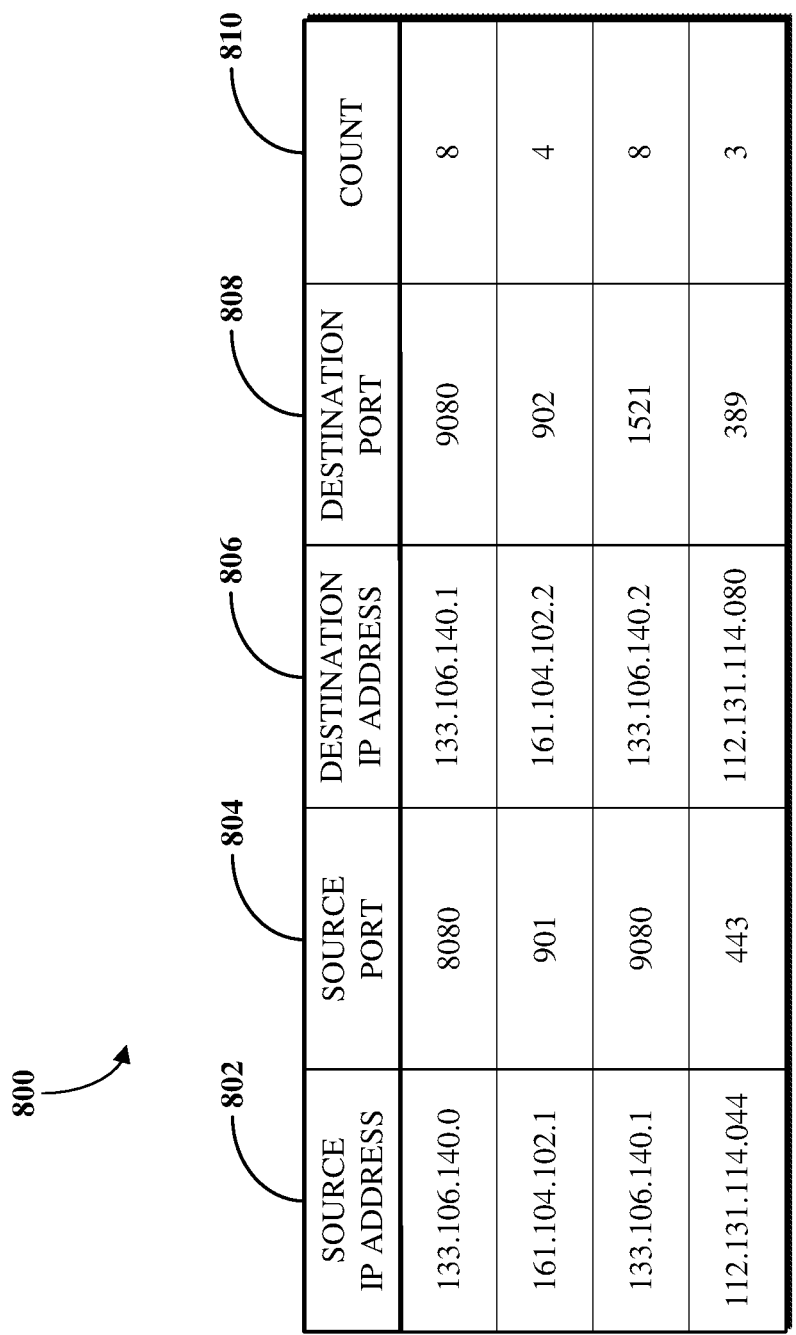
FIG. 8 is an illustration of an example of a table storing collected network flow data.

FIG. 8 is an illustration of an example of a table 800 storing collected network flow data. The table 800 is a data structure accessible by the agent software that identifies the connections between respective components in a computer network. The table 800 includes the columns source IP address 802, source port 804, destination IP address 806, destination port 808, and count 810. The source IP address 802 stores an IP address of a component that sends a data packet as part of a subject network flow. The source port 804 stores a port the component uses to send the data packet. The destination IP address 806 stores an IP address of a component that receives the data packet from the component represented by the columns 802 and 804. The destination port 808 stores the port via which the component receives the data packet. The count 810 indicates a total number of times that the network flow has been identified within the computer network.

Entries in the table 800 correspond to individual network flows collected within the computer network (e.g., using the network flow monitor module 500 shown in FIG. 5). A first occurrence of a network flow identified within the computer network can be used to generate a new entry in the table 800, whereas subsequent identifications of that network flow within the computer network can be aggregated with the existing entry therefor in the table 800. The table 800 can use a least-recently-used policy to delete data upon the amount of data stored in the table 800 reaching or meeting a maximum storage capacity.

Implementations of the table depicted in FIG. 8 can include additional, less, or combined functionality as described above, or functionality other than that described above, or combinations thereof. In some implementations, the table 800 can store collected network flow data associated with multiple identified connections, for example, connections that might be determined to be a sequence. For example, the table 800 can include a number of pairs of columns for storing IP addresses and ports of destination and source components. In this way, a first pair of columns can include network flow data associated with a connection between a first component and a second component, and a second pair of columns can include network flow data associated with a connection the second component and a third component. The number of pairs of columns in the table 800 can be configured, such as by a network administrator of a customer environment.

An instance of the table 800 can store data for a connection or sequence of connections. There can be multiple instances of the table 800 that can each store data for different connections or sequences of connections. For example, a first instance of the table 800 can store data associated with a first sequence of connections determined using network flow data and a second instance of the table 800 can store data associated with a second sequence of connections determined using the same or different network flow data.

To facilitate the storing of connections or sequences of connections in respective instances of the table 800, hash values of the connections or sequences of connections can be used. For example, a connection or sequence of connections can be hashed according to the particular network flow(s) associated therewith (e.g., where the hashed value is serialized according to an identification of the source or destination components thereof). Respective instances of the table 800 can correspond to a hash value indicative of the particular connection or sequence of connections for which data is stored therein. The hash value for a connection can be generated upon identifying the corresponding network flow within a sliding window (e.g., as discussed with respect to FIG. 7), or the hash value for a sequence of connections can be generated upon determining same using the network flow data. The system can determine the instance of the table 800 within which to store the data by comparing the hash value thereof to the hash values of the instances of the table 800. The system can then update that instance of the table 800 by storing aspects of the network flow data therein. However, if no instance of the table 800 matches the hash value of the network flow data, a new instance of the table 800 can be created and associated with that hash value. It may, for example, be advantageous to store the network flow data in multiple tables, such as in order to reduce the computational complexity of storing aspects of the network flow data and subsequently using the stored data to infer attributes of components for which credentials are not available.

In some implementations, the table 800 can store information other than as shown in FIG. 8. For example, the table 800 can include fields indicating an identifier of the table (e.g., assigned by the agent software 302), a timestamp indicating a date or time at which the table is created, or a last update time indicating a last date or time at which the table is updated. In another example, the table 800 can include one or more columns for storing data indicating a confidence measure of the network flow (e.g., a probabilistic degree to which the stored data is actually relevant for determining a sequence of connections associated with a software service of a computer network). For example, the confidence measure can be a threshold number that the count in 810 is to exceed before the connection indicated by the network flow can be used to determine a sequence of connections. In another example, the confidence measure can be related to components associated with the network flow such that components that are more likely than not to communicate data with one another (e.g., a load balancer and a web server) can have a higher confidence measure even when the count thereof is low.

In another example, the confidence measure can be a number of weighted values usable to indicate a probability that the connection is relevant to a software service for which a sequence of connections is to be determined. Each weighted value can represent a different confidence measure, such as confidence measures associated with different aspects of using the stored data. For example, a first weighted value can indicate a probability that the IP address and port combination between a source component and a destination component is relevant to determining a sequence of connections. A second weighted value can indicate a probability that the connection is associated with multiple sequences of connections. In implementations where the table 800 includes columns for storing data associated with multiple connections, a third weighted value can indicate a probability that the connections are associated with a common software service of the computer network.

In some implementations, one or more tables (not shown) can be stored in a database accessible by platform software (or other management software, as applicable) executing in a datacenter, such as the datacenter 108 shown in FIG. 1. For example, one such table can include columns for storing the network flow data of the table 800 such that the platform software or other management software can more easily access the data. In another example, one such table can include columns for storing IP addresses or ports inferred (e.g., using the network flow data) to be that of servers (e.g., a web server, a database server, a physical server, or another server). For example, a component for which credentials are not available can be inferred to be a server where the connections with which it is associated (e.g., those connections in which an IP address or port corresponds to an unidentified component) have respective counts that exceed a configurable threshold or otherwise exceed the counts associated other connections identified by the network flow data. A component for which credentials are not available can also or instead be inferred to be a server by comparing the IP address and port of the source and destination components to CIs of the CMDB to determine if the CIs associated with same are known to be servers. In another example, one such table can include columns for storing IP addresses or ports associated with connections between servers. That is, information stored in a table including data of inferred servers can be cross-referenced with network flow data to indicate where an identified connection might be between two servers. This table can include a counter for tracking the number of times the connection between the two servers is identified.

Figure 9:
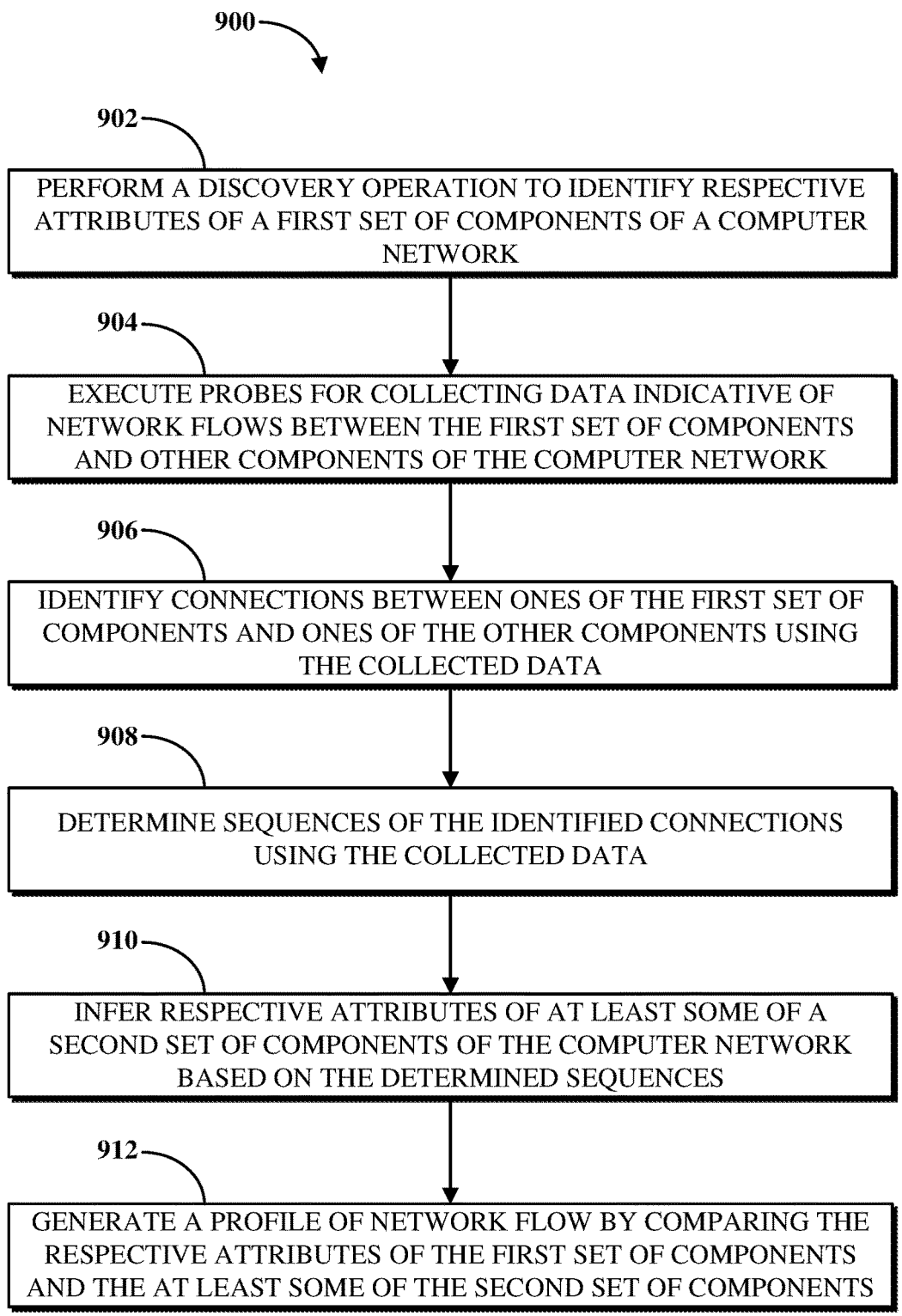
FIG. 9 is a flowchart illustrating an example of a technique for identifying components of a computer network based on component connections.

FIG. 9 is a flowchart illustrating an example of a technique 900 for identifying components of a computer network based on component connections, such as in the system 100 as generally illustrated in FIG. 1. In some implementations, the technique 900 can be executed using computing devices, such as the systems, modules, and devices described with respect to FIGS. 1, 2, 3, and 5. In some implementations, the technique 900 can be performed, for example, by executing a machine-readable program or other computer-executable instructions, such as instructions or programs described according to JavaScript, C, or other such instructions. The steps, or operations, of the technique 900 or any other method, process, or algorithm described in connection with the implementations disclosed herein can be implemented directly in hardware, firmware, software executed by hardware, circuitry, or a combination thereof.

The technique 900 may include performing a discovery operation in a computer network 902, executing probes for collecting network flow data in the computer network 904, identifying connections between components of the computer network using the collected network flow data 906, determining sequences of the identified connections using the collected network flow data 908, inferring attributes of at least some components of a computer network based on the determined sequences 910, and generating a profile of network flow by comparing the inferred attributes and attributes identified via the discovery operation 912. In some implementations, the operation 902 can be associated with a first discovery operation and the operations 904, 906, 908, 910, and 912 can be associated with a second discovery operation.

At 902, a discovery operation can be performed to identify attributes of components of a computer network. Performing the discovery operation can include agent software executing in the computer network running discovery probes to identify attributes of the computer network for which credentials are available. Components having attributes identified at 902 can be identified collectively as a first set of components. At 904, network flow probes can be sent by a server (e.g., on which platform software or other management software operates, such as within a datacenter) to collect data indicative of network flows occurring within the computer network. The network flow probes can indicate configurations of network flows to be collected, sliding windows within which to collect network flow data, or other parameters usable (e.g., by the network flow monitor module 500 shown in FIG. 5) to collect network flow data. Sending the network flow probes at 904 can include the server sending network flow probes implemented as scripts to agent software executing within the computer network, which agent software executes the scripts to collect the data. Sending the network flow probes at 904 can also or instead include the server executing the network flow probes (which might be implemented as scripts) and sending the executed instructions into the computer network via the agent software. Sending the network flow probes at 904 can thus also include the execution of the network flow probes by the server, the agent software, or another component.

At 906, connections can be identified between components of the computer network based on the network flow data collected at 904. The connections can show communications of data between components of the first set of components identified at 902 and other components of the computer network for which credentials are unavailable. A connection can be identified by identifying one of a source component or a destination component indicated by a network flow as a component of the first set by comparing the IP address or port thereof with the known attributes of the first set of components. Accordingly, the other is determined to be not of the first set of components by virtue of the first set of components not having known attributes matching the IP address or port thereof.

At 908, sequences of the connections identified at 906 can be determined using the network flow data. A sequence of connections can include a plurality of connections showing a consecutive transmission or receipt of data between components of the computer network. A sequence of identified connections can be determined by comparing network flow data (e.g., source IP address or port, or destination IP address or port) to information stored in database records associated with the computer network. For example, the database records can be CIs of a CMDB. As such, a sequence can be determined by identifying CIs representing known components (e.g., components of the first set identified at 902) and then determining that other CIs in the respective hierarchy (e.g., established via parent-child CI relationships) are of the other components.

At 910, attributes of such other components of the computer network can be inferred based on the sequences determined at 908. Using the sequences, CIs representing components not identified within the first set can be identified. Information associated with those CIs can then be used to identify the other components. At 912, a profile of network flow can be generated by comparing the attributes of the first set of components with the attributes of at least some of the other components. That is, a network flow profile usable for further identification of the respective components of the computer network can be generated by comparing various attributes of the components identified at 902 and inferred at 910 to determine that the components are involved in providing a common software service to clients of the computer network.

Although the technique 900 is shown as a series of operations for clarity, implementations of the technique 900 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

The technique 900 can include creating or updating a map of a service model of a customer environment using the network flow data collected at 904. The service model can include an entry point used by clients to access a software service provided by the service model, such as by a URL pointing to an IP address or port of a first component (e.g., a load balancer). The sequences of connections determined at 908 can then be used to map out further components connecting to that first component. In this way the determined sequences of connections can be used to map out a last component used to provide a software service within a customer environment. For example, a URL received from a client device can indicate an IP address 10.1.1.1 and a port 9080 of a Websphere. Connections identified at 906 using the network flow data collected at 904 can indicate that a first component having the IP address 10.1.1.1 and port 9080 connects to a second component at IP address 10.1.1.0 and port 8080, and that that second component connects to a third component at IP address 10.1.1.2 and port 1521. As such, a sequence of connections between the first, second, and third components can be identified. Upon determining that the IP address and port of the first component match the IP address and port of the CI representing the Websphere in a CMDB, the Websphere can be identified as the first component. The second component and third component, which might respectively be an Apache web server and an Oracle database server, can thus be identified as connecting to the Websphere to provide a software service.

The technique 900 can include configuring values for one or more elements used to infer attributes of components for which credentials are not available. For example, the size of a sliding window used to filter collected network flow data can be configured (e.g., by time, known ports, or the like, or combinations thereof). In another example, the threshold for a count of connections to exceed before a sequence of connections is determined therefrom can be configured (e.g., to a requisite degree of probability, such as by indicating a minimum number of times that connections are to be identified within the network flow data). In another example, other parameters for determining sequences of connections or collecting network flow data can be configured (e.g., so that only those connections including IP addresses included in a list of subnet or a listed subnet range, or so that only those connections not associated with known ports, can be collected for determining sequences). In another example, parameters for purging data from a table storing network flow data, such as network flow data associated with an identified connection or connections usable for determining a sequence of connections, can be configured (e.g., based on a policy to be used for purging the data, such as a least recently used policy).

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC) or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for identifying components of a computer network based on connections between the components, the system comprising:
   a memory; and
   a processor,
   wherein the memory includes instructions executable by the processor to:
      perform a first discovery operation to identify respective attributes of a first set of components, wherein the computer network includes the first set of components and a second set of components having respective attributes not identifiable by the first discovery operation; and
      perform a second discovery operation comprising instructions to:
         send probes configured to collect network flow data indicative of network flows between components of the first set of components and the second set of components of the computer network; and
         using the collected network flow data:
            identify connections between ones of the first set of components and ones of the second set of components,
            determine sequences of the identified connections, and
            infer respective attributes of at least some of the second set of components based on the determined sequences of the identified connections.

2. The system of claim 1, wherein a network flow between two components indicates a source IP address and a source port of a source component and a destination IP address and a destination port of a destination component.

3. The system of claim 2, wherein the collected network flow data indicates a first connection between a first component and a second component and a second connection between the second component and a third component,
   wherein, the collected network flow data indicates that for the first connection, the first component is the source component and the second component is the destination component, such that a request associated with the first connection is sent at a source port of the first component and received at a destination port of the second component, and
   wherein, the collected network flow data indicates that for the second connection, the second component is the source component and the third component is the destination component, such that a request associated with the second connection is sent at a source port of the second component and received at a destination port of the third component.

4. The system of claim 3, wherein the instructions to identify the connections between the ones of the first set of components and the ones of the second set of components include instructions executable by the processor to:
   compare respective IP addresses of the first component and the third component to the identified respective attributes of the first set of components to determine that the first component and the third component are included in the first set of components; and
   compare an IP address of the second component to the identified respective attributes of the first set of components to determine that the second component is one of the second set of components.

5. The system of claim 3, wherein the network flow data is indicative of network flows observed over a period of time, and wherein the instructions to determine the sequences of the identified connections include instructions executable by the processor to:
   responsive to a determination that the request associated with the first connection and the request associated with the second connection are both sent during the period of time, determine that the first connection and the second connection form a sequence of identified connections from the first component to the third component.

6. The system of claim 5, wherein a determination that the first connection and the second connection form the sequence of identified connections is made responsive to a counter exceeding a threshold value,
   wherein the counter indicates a number of times the first connection and the second connection are identified during the period of time, and
   wherein the threshold value represents a minimum number of times that the first connection and the second connection are identified within the period of time before the determination that the first connection and the second connection form the sequence of identified connections is made.

7. The system of claim 3, wherein the instructions to infer the respective attributes of the at least some of the second set of components based on the determined sequences of the identified connections include instructions executable by the processor to:
   compare the IP address of the second component to IP addresses of components of the computer network to identify a database record associated with a component corresponding to the determined sequence of identified connections; and
   identify attributes of the second component based on the database record.

8. The system of claim 1, wherein the instructions include instructions executable by the processor to:
   store the identified respective attributes of the first set of components in a first set of configuration items of a configuration management database; and
   store the identified respective attributes of the second set of components in a second set of configuration items of the configuration management database.

9. A method for identifying components of a computer network based on connections between the components, the method comprising:
   performing a first discovery operation to identify respective attributes of a first set of components, wherein the computer network includes the first set of components and a second set of components having respective attributes not identifiable by the first discovery operation; and
   performing a second discovery operation by:
      sending probes for collecting network flow data indicative of network flows between components of the first set of components and the second set of components of the computer network;
      using the collected network flow data:
         identifying connections between ones of the first set of components and ones of the second set of components,
         determining sequences of the identified connections, and
         inferring respective attributes of at least some of the second set of components based on the determined sequences of the identified connections.

10. The method of claim 9, wherein a network flow between two components indicates a source IP address and a source port of a source component and a destination IP address and a destination port of a destination component.

11. The method of claim 10, wherein the network flow data indicates a first connection between a first component and a second component and a second connection between the second component and a third component,
wherein, the collected network flow data indicates that for the first connection, the first component is the source component and the second component is the destination component, such that a request associated with the first connection is sent at a source port of the first component and received at a destination port of the second component, and
wherein, the collected network flow data indicates that for the second connection, the second component is the source component and the third component is the destination component, such that a request associated with the second connection is sent at a source port of the second component and received at a destination port of the third component.

12. The method of claim 11, wherein identifying the connections between ones of the first set of components and ones of the other components comprises:
comparing respective IP addresses of the first component and the third component to the identified respective attributes of the first set of components to determine that the first component and the third component are of the first set of components; and
comparing an IP address of the second component to the identified respective attributes of the first set of components to determine that the second component is one of the second set of components.

13. The method of claim 11, wherein the network flow data is indicative of network flows observed over a period of time, and wherein determining the sequences of the identified connections comprises:
responsive to determining that the request associated with the first connection and the request associated with the second connection are both sent during the period of time, determining that the first connection and the second connection form a sequence of identified connections from the first component to the third component.

14. The method of claim 13, wherein determining that the first connection and the second connection form the sequence of identified connections is made responsive to a counter exceeding a threshold value,
wherein the counter indicates a number of times the first connection and the second connection are identified during the discrete period of time, and
wherein the threshold value represents a minimum number of times that the first connection and the second connection are to be identified within the discrete period of time before the determining that the first connection and the second connection form the sequence of identified connections is made.

15. The method of claim 11, wherein inferring the respective attributes of the at least some of the second set of components based on the determined sequences of the identified connections comprises:
comparing the IP address of the second component to IP addresses of components of the computer network to identify a database record associated with a component corresponding to the determined sequence of identified connections; and
identifying attributes of the second component based on the database record.

16. The method of claim 9, further comprising:
storing the identified respective attributes of the first set of components in a first set of configuration items of a configuration management database; and
storing the identified respective attributes of the second set of components in a second set of configuration items of the configuration management database.

17. A non-transitory computer-readable storage medium comprising executable instructions that, when executed by a processor, facilitate the performance of operations comprising:
sending discovery probes to produce probe data associated with a first set of components of the computer network for which credentials are available, wherein attributes of the first set of components are identifiable using the probe data; and
sending network flow probes to collect network flow data associated with a second set of components of the computer network for which credentials are not available, wherein the collected network flow data is processed with the attributes of the first set of components to infer attributes of the second set of components.

18. The non-transitory computer-readable storage medium of claim 17, wherein the network flow data indicates a first connection between a first component and a second component and a second connection between the second component and a third component, and wherein the executable instructions, when executed by the processor, facilitate the performance of operations comprising:
comparing respective IP addresses of the first component and the third component to respective attributes of the first set of components to determine that the first component and the third component are of the first set of components; and
comparing an IP address of the second component to respective attributes of the first set of components to determine that the second component is not of the first set of components.

19. The non-transitory computer-readable storage medium of claim 18, wherein the network flow data is indicative of network flows observed over a period of time, and wherein the executable instructions, when executed by the processor, facilitate the performance of operations comprising:
responsive to a determination that a request associated with the first connection and a request associated with the second connection are both sent during the period of time, determining that the first connection and the second connection form a sequence of identified connections from the first component to the third component.

20. The non-transitory computer-readable storage medium of claim 19, wherein the executable instructions, when executed by the processor, facilitate the performance of operations comprising:
comparing the IP address of the second component to IP addresses of components of the computer network to identify a database record associated with a component corresponding to the determined sequence of identified connections; and
inferring the respective attributes of the second set of components based on the database record.

* * * * *